(12) United States Patent
Dürr

(10) Patent No.: US 11,014,193 B2
(45) Date of Patent: May 25, 2021

(54) CONTROL DEVICE AND METHOD FOR CONTROLLING THE LASER BEAM DEFLECTION

(71) Applicant: SIEMENS AKTIENGESELLSCHAFT, Munich (DE)

(72) Inventor: Matthias Dürr, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 333 days.

(21) Appl. No.: 15/764,462

(22) PCT Filed: Sep. 16, 2016

(86) PCT No.: PCT/EP2016/072011
§ 371 (c)(1),
(2) Date: Mar. 29, 2018

(87) PCT Pub. No.: WO2017/055110
PCT Pub. Date: Apr. 6, 2017

(65) Prior Publication Data
US 2018/0281107 A1 Oct. 4, 2018

(30) Foreign Application Priority Data
Sep. 30, 2015 (EP) .................................... 15187522

(51) Int. Cl.
*B23K 26/04* (2014.01)
*G02B 26/08* (2006.01)
(Continued)

(52) U.S. Cl.
CPC ............ *B23K 26/043* (2013.01); *B22F 3/105* (2013.01); *B23K 26/082* (2015.10);
(Continued)

(58) Field of Classification Search
CPC .. B23K 26/043; B23K 26/082; B23K 26/821; B23K 26/342
See application file for complete search history.

(56) References Cited

U.S. PATENT DOCUMENTS 3,769,488 A * 10/1973 Hasslinger ............... A41H 3/00
219/121.72
3,979,591 A * 9/1976 Silverman ............ B23K 26/032
250/317.1
(Continued)

FOREIGN PATENT DOCUMENTS

DE 112010004503 T5 10/2012
DE 10 2013 103 006 A1 10/2013
(Continued)

OTHER PUBLICATIONS

PCT International Search Report and Written Opinion of International Searching Authority dated Nov. 3, 2016 corresponding to PCT International Application No. PCT/EP2016/072011 filed Sep. 16, 2016.

*Primary Examiner* — Erin E McGrath
(74) *Attorney, Agent, or Firm* — Henry M. Feiereisen LLC

(57) ABSTRACT

A method and a control device for deflection of a laser beam for laser-based additive manufacturing processes includes first and second orthogonally rotatable mirrors designed to reflect the laser beam and guide the laser beam to an irradiation field. The first mirror and the second mirror are secured on respective first and second shafts, with the first mirror performing a continuous first vibration with a first frequency, and the second mirror performing a continuous second vibration with a second frequency different from the first frequency and/or with a phase difference with respect to the first vibration. Each of the two shafts has a known position such that the first vibration is synchronous with the
(Continued)

second vibration. The laser is activated/deactivated upon reaching/leaving an irradiation point. The generated vibrations of the mirrors describe a continuous Lissajous curve.

19 Claims, 3 Drawing Sheets

(51) Int. Cl.
  B23K 26/082    (2014.01)
  B23K 26/342    (2014.01)
  B29C 67/04     (2017.01)
  B23K 26/144    (2014.01)
  B22F 3/105     (2006.01)
  G02B 26/10     (2006.01)
  B22F 10/00     (2021.01)
  B22F 10/10     (2021.01)
(52) U.S. Cl.
  CPC ........ *B23K 26/0821* (2015.10); *B23K 26/144* (2015.10); *B23K 26/342* (2015.10); *B29C 67/04* (2013.01); *G02B 26/0816* (2013.01); *B22F 10/00* (2021.01); *B22F 10/10* (2021.01); *G02B 26/101* (2013.01); *Y02P 10/25* (2015.11)

(56) References Cited

U.S. PATENT DOCUMENTS

| | | | |
|---|---|---|---|
| 4,439,715 A * | 3/1984 | Taylor | G05D 3/10 318/467 |
| 5,582,752 A | 12/1996 | Zair | |
| 5,618,285 A * | 4/1997 | Zair | A61B 18/20 606/10 |
| 9,694,497 B2 | 7/2017 | Burmeister et al. | |
| 9,766,871 B2 | 9/2017 | Dallmann et al. | |
| 2013/0270750 A1 | 10/2013 | Green | |
| 2014/0330260 A1* | 11/2014 | Bergt | B23K 26/38 606/5 |
| 2015/0198052 A1* | 7/2015 | Pavlov | B28B 1/001 416/241 B |
| 2017/0014950 A1 | 1/2017 | Okada | |

FOREIGN PATENT DOCUMENTS

| | | |
|---|---|---|
| JP | S57179818 A | 11/1982 |
| WO | WO 2015/141032 A1 | 9/2015 |

* cited by examiner

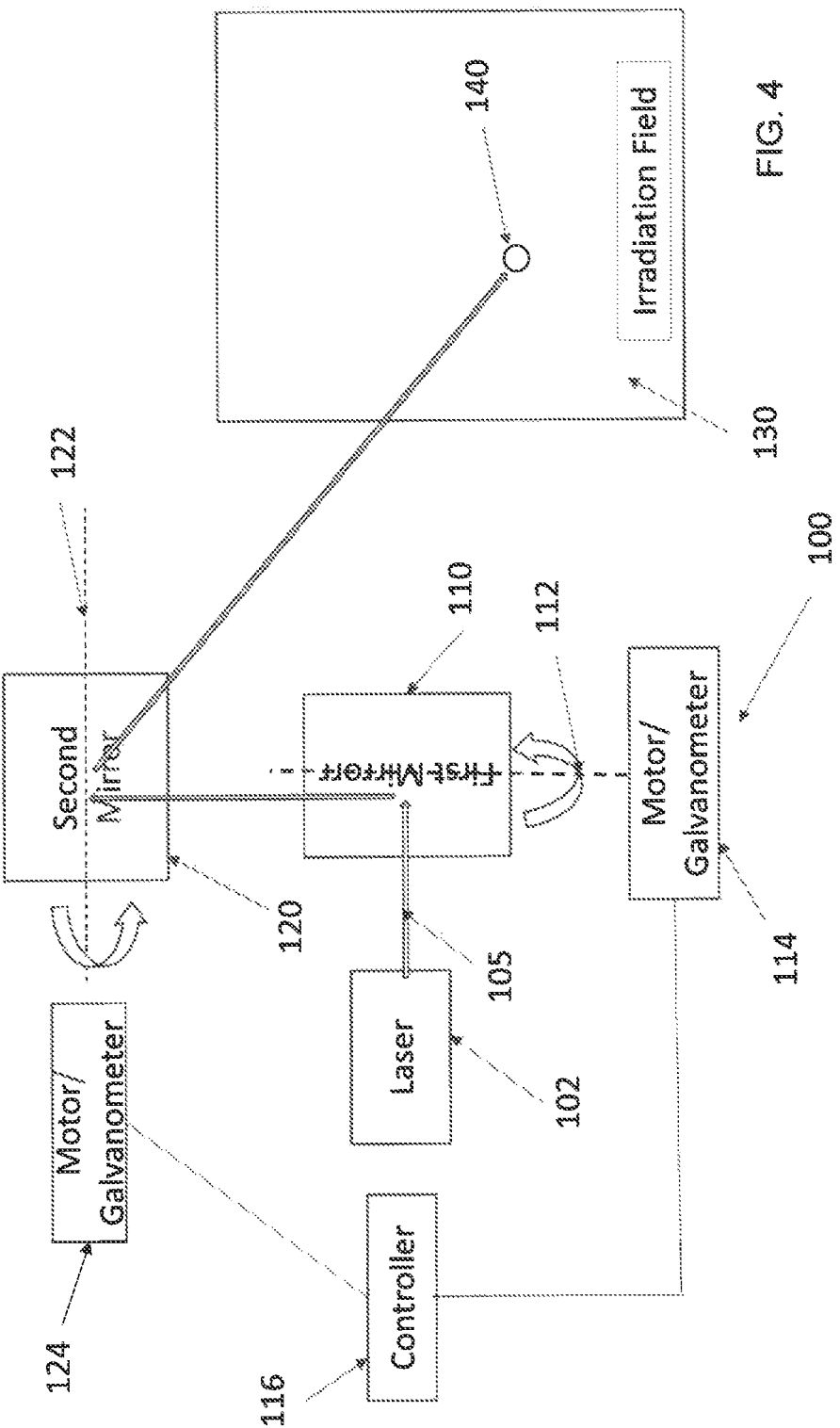

CONTROL DEVICE AND METHOD FOR CONTROLLING THE LASER BEAM DEFLECTION

CROSS-REFERENCES TO RELATED APPLICATIONS

This application is the U.S. National Stage of International Application No. PCT/EP2016/072011, filed Sep. 16, 2016, which designated the United States and has been published as International Publication No. WO 2017/055110 and which claims the priority of European Patent Application, Ser. No. 15187522.6, filed Sep. 30, 2015, pursuant to 35 U.S.C. 119(a)-(d).

BACKGROUND OF THE INVENTION

The invention relates to a control device for laser beam deflection for the processing of irradiation points in an irradiation field by means of a laser beam for laser-based additive manufacturing processes, having at least one first and one second orthogonally rotatable vertical mirror, via which the laser beam can be reflected, for guiding the laser beam to the irradiation field, and wherein the first mirror is secured on a first shaft and wherein the second mirror is secured on a second shaft. The invention further relates to a method for controlling the laser beam deflection.

In many companies of almost all branches of industry the use of various rapid prototyping methods, such as additive manufacturing for example, has become a fixed element in the development of new products. Product development times and market introduction times that are becoming ever shorter as well as the increased pressure to save time and money demand suitable methods for manufacturing component and tool prototypes within fewer hours, where possible from highly-durable materials close to those used in series production, such as steel for example.

Additive manufacturing, selective laser beam melting/sintering, stereo lithography in liquids etc., involve a group of processes that are characterized by three-dimensional components being manufactured by essentially two-dimensional layers (or substrates) being built up layer-by-layer. In general each of the layers is very thin (for example between 20 and 100 micrometers), and many layers are formed one after the other, wherein the two-dimensional form changes with each layer, so that the desired final three-dimensional profile is produced. By contrast with conventional manufacturing processes, in which material is removed to form a desired component profile, with additive manufacturing processes, material is added progressively in order to form a finished component that is faithful to final contours or close to final contours.

To this end the laser source, e.g. a laser scanner with two mirrors, is typically connected to a galvanoscope/galvanometer, which moves the mirrors, so that the beam is guided to a point or a defined line. Through this, together with the varying laser beam intensity, the energy input by the laser into the material or substrate is determined locally. However the following problems arise here:

One is that the laser scanner needs a very fast discontinuous mechanical movement of the mirrors, from which problems result with the inertia and the acceleration/deceleration.

A second irradiation point in each case needs a defined movement of the beam from a first irradiation point. Since this movement is an individual process, a large number of individual process parameters must be provided for said process. The process parameters include coordinate translations, path length, relative setting of the mirrors as well as their range of movement, laser scanner characteristics, acceleration, target coordinates and temperature equalization etc. All these parameters represent possible sources of error however.

Another problem is that at least two movement modes are also needed for the laser: One in operating mode; here the laser is active, as well as one in travel mode. Here the laser is inactive. Since in travel mode no process-related conditions (coupling of the laser beam into the substrate) are needed, the travel mode, provided the laser system allows this, can be carried out more quickly.

irradiation strategies such as multiple irradiation by a single laser (laser unit) for laser beam melting for example, in which an inertia-free orientatable electron beam is projected practically simultaneously onto a number of points of the irradiation field, e.g. for local preheating/prewarming of a given area to be irradiated, are not able to be implemented. For prewarming a number of laser units are used at the same time in the prior art. Digital Light Processing Chips can also be used, with which images are created by a digital image being modulated onto a laser beam. Because of the low energy input the application is restricted to SLAs however and is not transferrable for applications in which a higher energy input is needed, such as e.g. laser beam melting.

Nowadays therefore the processing by the laser can be implemented with sufficient accuracy, but only with increased computing effort/calculation effort and irradiation strategies. Each additional movement however influences the performance and the precision of the irradiation process.

SUMMARY OF THE INVENTION

The first and second object of the invention is to specify a control device for laser beam deflection and a method for controlling the laser beam deflection for the processing of irradiation points for generative manufacturing of at least one area of a component, with which a secure and reproducible result will be created.

The first object is achieved by the specification of a control device for laser beam deflection for the processing of irradiation points in an irradiation field by means of a laser beam for laser-based additive manufacturing processes, comprising:

at least one first and one second orthogonally rotatable vertical mirror, via which the laser beam can be reflected, for guiding the laser beam to the irradiation field, wherein the first mirror is secured to a first shaft and wherein the second mirror is secured to a second shaft, wherein the first rotatable mirror can be caused to move with a continuous first vibration with a first frequency by the first shaft, and wherein the second rotatable mirror can be caused to move with a continuous second vibration with a second frequency by the second shaft, and wherein the first frequency is different from the second frequency and/or the first vibration has a phase difference to the second vibration, and wherein each of the two shafts has a known position, such that the first vibration can be generated synchronously to the second vibration via the known position of the two shafts, such that a position-dependent irradiation of the irradiation points in the irradiation field can be brought about via position-dependent activation/deactivation of the laser upon reaching/leaving an irradiation point of this type, wherein a continuous Lissajous curve is described in the irradiation field via the generated vibrations of the mirrors.

The second object is achieved by the specification of a method for controlling the laser beam deflection for the processing of irradiation points in an irradiation field by means of a laser beam for laser-based additive manufacturing processes with the steps:

guiding the laser beam to the irradiation field by reflection from at least one first via a second orthogonally rotatable vertical mirror, securing of the first mirror to a first shaft and of the second mirror to a second shaft, comprising:

an excitation of the first rotatable mirror to a continuous first vibration with a first frequency by the first shaft, an excitation of the second rotatable mirror to a continuous second vibration with a second frequency by the second shaft, an arrangement of the first frequency different to the second frequency and/or having a phase difference between the first vibration and the second vibration, having a known position of each of the two shafts, such that the first vibration can be generated synchronously to the second vibration via the known position of the two shafts, such that a position-dependent irradiation of the irradiation points in the irradiation field is brought about via position-dependent activation/deactivation of the laser upon reaching/leaving an irradiation point of this type, wherein a continuous Lissajous curve is described in the irradiation field via the generated vibrations of the mirrors.

In this way two "deterministically" synchronized vibrations (=the position of the two shafts is known exactly right from the start) are created. Through the invention an ongoing oscillating status for the laser scanning is created, which can be modeled and optimized easily and precisely. In this way the complexity of the dynamics of the mirror movements is significantly reduced, which on the one hand reduces costs and on the other hand improves the stability and predictability of the dynamic machine behavior.

Also the known, repeating positions of the mirrors and therefore the known, repeating positions of the laser beam in the irradiation field enable not only a simple irradiation, but also simple multiple irradiation of the necessary irradiation points to take place. The continuous movement of the mirrors and the movement pattern proposed here inherently fit the design paradigm of "lattice grids" (representation of geometrical bodies by a locally modified infinite series of elements), which is used at present to exploit the full potential of additive manufacturing in CAD systems (high number of elements, bionic forms, spatial consistencies).

In the invention a continuous Lissajous curve in the irradiation field can be described by the vibrations of the mirrors.

Further advantageous measures, which can be combined with one another in any given way in order to achieve further advantages, are listed in the dependent claims.

Preferably the Lissajous curve is closed. Thus closed curves are only produced when the ratio of the frequencies is rational, otherwise the vibration practically never ends. In a preferred embodiment the frequencies and the phase difference can be selected such that the Lissajous curve is a grid with sufficient accuracy. Preferably the first and also the second frequency and the phase difference are embodied such that the Lissajous curve is able to be formed as an internal low-distortion ideal grid and external outer grid. Such a grid is visible when the first and also the second frequency lies in the range of 10 kHz for example, and the phase difference lies in the range 100 Hz. This Lissajous curve is projected in this case continuously onto the irradiation field, such that an iterative irradiation of the irradiation points can be undertaken. Preferably only the inner area of the created Lissajous curve is used, namely the low-distortion "quasi grid". Here am almost ideal grid is projected, distortions in the corners, which could result in imprecise irradiation, are avoided. In this case the ideal grid is projected with a sufficiently high resolution onto the powder bed. Moreover the one Lissajous curve has the necessary stability for the irradiation.

In a preferred embodiment different layers are provided for iterative irradiation by the laser beam, wherein a first Lissajous curve for irradiation of a first layer and a second Lissajous curve for irradiation of a further layer can be created by the mirrors, which are both employed for the irradiation of the respective layer. This thus very easily enables complex geometries, especially geometries exhibiting a high complexity in the edge area, to be irradiated in a simple manner.

Also an iterative multiple irradiation of the irradiation points by just one Lissajous curve can of course be undertaken. This enables a prewarming to take place in a simple manner for example.

In a preferred embodiment, for determining the position of the first and also of the second shaft, a calibration of the shafts is provided. Through this the position of the shafts is known precisely.

Preferably the shafts are operated with a motor and a controller or oscillators, in particular coils, in order to create a continuous oscillation of the two mirrors in relation to one another. In this case the motor is advantageously embodied by electronically or digitally synchronized servomotors. Through their construction, the oscillators advantageously maintain a frequency, in particular a resonant frequency, and/or can be created by speed-stabilized motors. A continuous, simple vibration of the mechanical parts exists by contrast with the separate (discrete), highly-individual (single) movements. This means that no problems arise with decelerations/accelerations etc. as occur in the prior art. Moreover the continuous oscillation of the two mirrors is created here in a simple manner.

BRIEF DESCRIPTION OF THE DRAWING

Further features, characteristics and advantages of the present invention emerge from the description given below, which refers to the enclosed figures. In said figures, in schematic diagrams:

FIG. 4 shows a control device according to the present invention.

DETAILED DESCRIPTION OF PREFERRED EMBODIMENTS

Figure 1:
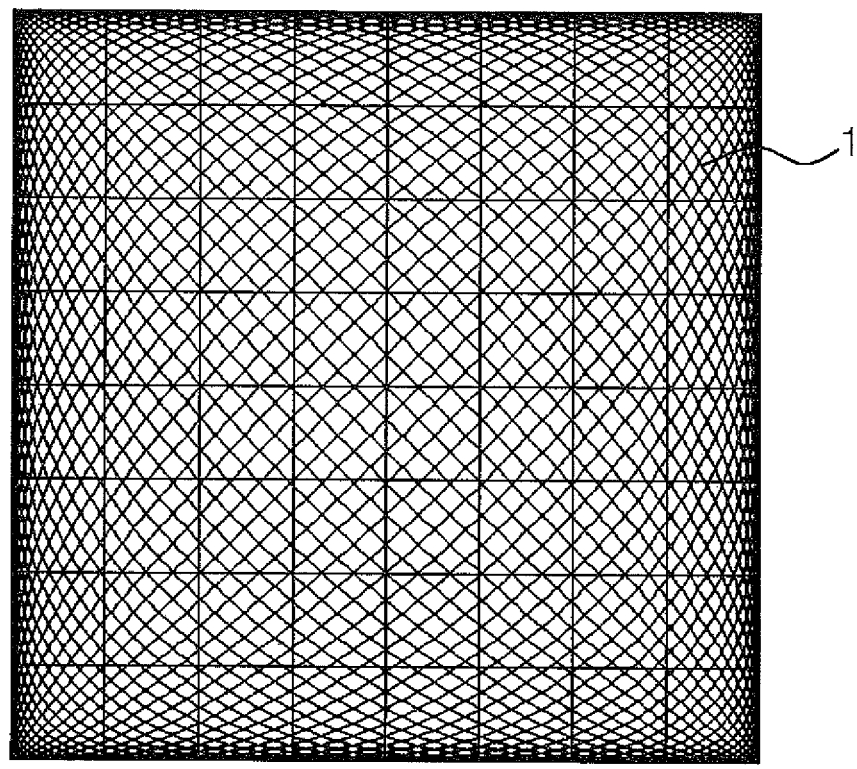
FIG. 1: shows a Lissajous curve with a first and a second frequency of 10 kHz and a phase difference of +/−100 Hz.

Although the invention has been illustrated and described in greater detail by the preferred exemplary embodiment, the invention is not restricted by the disclosed examples. Variations herefrom can be derived by the person skilled in the art, without departing from the scope of protection of the invention, as is defined by the following claims.

It has been recognized in accordance with the invention that on the one hand the mechanical inertia of the mirrors or of the mirrors by comparison with the shafts is a first problem. On the other hand the problem lies in the fact that the desired pattern/display pattern in the irradiation field is to be specified in or to be divided into single, individual movements/irradiation points. I.e. the desired irradiation points must be projected onto a default pattern to be illuminated.

In accordance with the invention it has further been recognized that through the continuous movement of the mirrors of the scanner or of a galvanoscope, the irradiation field, e.g. powder bed, will be covered iteratively, i.e. repeatedly, in a defined specific way and sufficiently precisely. I.e. a mechanically continuously operating projection method for laser-based (additive manufacturing) processes is specified, which creates a predetermined pattern.

To this end a control device 100 has a laser 102 for laser beam deflection for the processing of irradiation points in an irradiation field 130 by means of a laser beam 105. In this case at least one first orthogonally rotatable mirror 110 and one second orthogonally rotatable mirror 120 via which the laser beam 105 can be reflected, for guiding the laser beam 105 to the irradiation field 130 are provided. The first mirror 110 in this case is secured on a first shaft 112, the second mirror on a second shaft 122. The first rotatable mirror 110 is secured on the first shaft 112 for excitation to a continuous first vibration with a first frequency; the second rotatable mirror 120 is secured on the second shaft 122 for excitation to a continuous second vibration with a second frequency, and wherein the first frequency is different from the second frequency and/or the first vibration has a phase difference to the second vibration. In accordance with the invention each of the two shafts 112, 122 has a known position, such that the first vibration can be generated synchronously to the second vibration via the known position of the two shafts 112, 122, such that a position-dependent irradiation of the irradiation points 140 in the irradiation field 130 can be brought about via position-dependent activation/deactivation of the laser 102 upon reaching/leaving an irradiation point 140 of this type.

In this way two synchronized "deterministic" vibrations (=the position of the two shafts is known exactly right from the start) are created, wherein a measurement may be needed for calibration of the two shafts.

Through this a suitable Lissajous curve is projected continuously onto the irradiation field, i.e. the powder bed. FIG. 1 shows a Lissajous curve, namely a grid 1 with a first and a second frequency of 10 kHz and a phase difference of +/−100 Hz. The frequencies are just examples in which the effect can easily be seen.

I.e. in accordance with the invention the layer to be attached is mapped onto a predetermined pattern, here namely the Lissajous curve.

Figure 2:
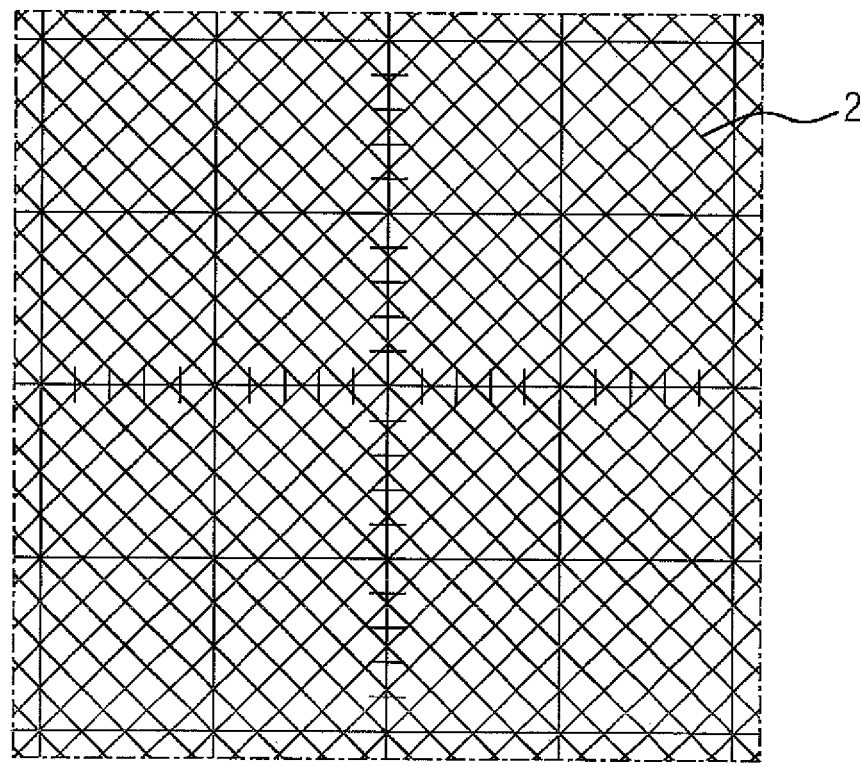
FIG. 2: shows a core area of the Lissajous curve with the first and a second frequency of 10 kHz and a phase difference of +/−100 Hz.

FIG. 2, as a complete curve of a lower order, shows the use of only the inner area of the above Lissajous curve, namely a low-distortion "virtual-grid". Here an almost ideal grid 2 is projected; distortions in the corners, which could be the result of imprecise irradiation, are avoided. In this figure the ideal grid 2 is projected at a sufficiently high resolution onto the powder bed.

In order to obtain continuously oscillating mirrors 110, 120, the two shafts 112, 122 must be suitably moved mechanically (in relation to one another). This can be done for example by means of a galvanoscope/galvanometer with a motor 114, 124 and a controller 116 or coils (not shown). In this case it is necessary to achieve a continuous oscillation of the two mirrors.

In practical terms a mechanical coupling between the mirrors, i.e. between the transmissions, can be undertaken by electronically or digitally tuned servomotors or oscillators, which by virtue of their construction maintain one frequency. In this case the frequency can be the resonant frequency or can be created by speed-stabilized motors. The only important factor here however is the precisely known position of the shaft.

With these preconditions fulfilled and a corresponding level of stability of the system it is relatively easy to model the relevant states of the system:

Within a stable Lissajous curve the y- and x-positions of the laser beam can be easily determined The mechanical behavior (resonances, distortions, thermal behavior etc.) for such a continuously oscillating system is well able to be determined in a static mechanical framework (stiffness, inertia, mass).

By contrast with the many dynamic states in which the various movements of the mirrors such as travel, decelerations, accelerations, stops, are described in the prior art, in the invention there is only one dynamic status for the entire irradiation. This is the continuous movement of the mirrors. Therefore more effort can be used in the modeling and the optimization of this status. This can be an active damping or also an improvement of the stiffness of the system.

With the invention the positions of the beam over time and also the errors of the mechanical model as well as possibly the thermal model of the layer formation are known. Through this a mapping of the model description, which is provided for example via the available operating system (NC-Code, GCODE, that represents a design as a point or a line), is undertaken onto the pattern that is created by the Lissajous curve. In this case use can be made in the mapping methods of image smoothing or of pattern recognition, which for example match elements available in the Lissajous curve in the best way to the design described by GCODE (point, zigzag line, line, square).

Figure 3:
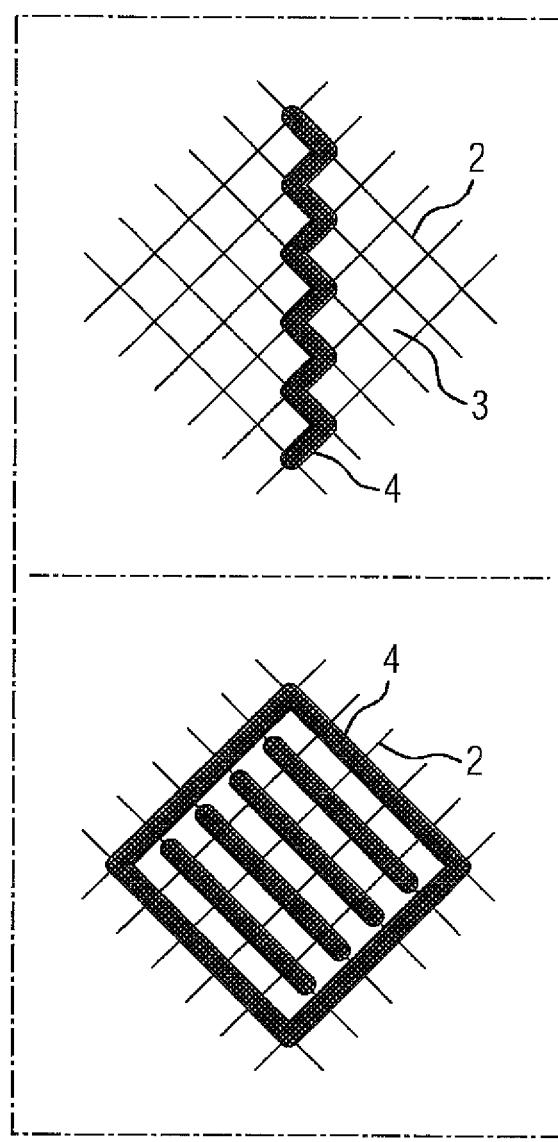
FIG. 3: shows examples of interpolated geometries of the Lissajous curve; above: Vertical lines, below: Squares.

Subsequently the laser is now triggered at least once (or each time) that the previously defined irradiation point (or the previously defined line segment) is addressed by the mirrors. FIG. 3 shows examples of Lissajous curves projected onto the irradiation field, i.e. of interpolated geometries of the Lissajous curve. Here the Lissajous curve is an ideal grid 2 in each case and thus covers the irradiation field iteratively by this ideal grid 2. Now the laser beam starts at "empty" points/lines 3, while at black (covered) points 4 the laser beam is activated. Through the continuous vibration of the mirrors in relation to one another and the knowledge of how the shafts are positioned in relation to one another, the position that the laser beam has is known at any time and it can therefore be activated and deactivated at suitable points. Thus the movement path of the laser beam in the Lissajous curve is produced. At the top in FIG. 3 vertical lines are illuminated or consolidated by the laser beam in the irradiation field; at the bottom squares are illuminated.

It should be noted that the Lissajous curve does not have to be mapped visibly onto the irradiation field; it is sufficient to know when the mirrors are positioned such that an irradiation point/line has been reached and the laser is to be activated.

Also the geometry that is created by the pattern of the Lissajous curve can be used in order to irradiate entire areas/lines (e.g. zigzag lines of FIG. 3).

The Lissajous curve can also be used alternately, in accordance with irradiation points to be irradiated or layer-by-layer and also in accordance with the resolution required (coarse resolution=low frequencies+high laser power etc.). Also a better connection between the individual layers to be irradiated ("masonry style") can be achieved. An irradiation of curved boundary geometries, which are necessary for example in order to generate statically advantageous geometries, e.g. "geodetic design", can also be implemented by the invention.

A continuous, oscillating status for the laser scanning, which can be easily and precisely modeled and optimized, is created by the invention. In this way the complexity of the dynamics is significantly reduced, which on the one hand reduces the costs and on the other hand improves the stability and predictability of the machine. The electrical activity, which is needed in order to address an irradiation point, namely essentially the activation of the laser, is always the same in a stable Lissajous curve.

As a result of the continuous full coverage of the irradiation field by the Lissajous curve, advanced irradiation strategies, e.g. similar to multi-beam for (selective) electron beam melting (S)EBM, can be easily applied. Also so-called checkpoints for the control/monitoring/calibration (geometry, laser power) can be provided with great frequency.

Advantageously the manufacturing of the component now no longer depends on the measure of how the irradiation field is arranged or on which additional features (reference parts, checkpoint) are used. The invention means that each irradiation with the same z-resolution and the absolute z-height requires the same time. Selected irradiation points/irradiation lines can be irradiated multiple times however or empty layers can be left out. The invention thus produces the following further advantages:

A continuous, simple vibration of the mechanical parts exists, by contrast with the separate (discrete), highly-individual (single) movements. This means that no problems arise with decelerations/accelerations etc. Moreover, in accordance with the invention, the inherent pattern geometries (grids) of the Lissajous curves are used to generate the irradiation of the irradiation points ("line patterns"). The invention also allows the advantages of an electron beam melting process with virtually simultaneous focal points to be used. The continuous movement of the mirrors and the movement pattern proposed here inherently fits the design paradigm of "lattice grids" (representation of geometrical bodies by a locally modified infinite series of elements), which are used at present in order to exploit the full potential of additive manufacturing in CAD systems (high number of elements, bionic forms, spatial consistencies).

The invention claimed is:

1. A control device for laser beam deflection for processing irradiation points in an irradiation field with a laser beam for laser-based additive manufacturing processes to produce three-dimensional components by layer-by-layer built-up of substantially two-dimensional layers, the control device comprising:
   at least one first rotatable mirror secured on a first shaft and excitable by the first shaft with a continuous first vibration having a first frequency and designed to reflect the laser beam;
   and at least one second rotatable mirror secured on a second shaft and excitable by the second shaft with a continuous second vibration having a second frequency that is different from the first frequency or a first phase that is different from a second phase of the second vibration, wherein the at least one second rotatable mirror rotates orthogonally with respect to the at least one first rotatable mirror, and the at least one first and second rotatable mirrors are designed to reflect the laser beam and to guide the laser beam to the irradiation field,
   wherein each of the first and second shafts has a known position, such that the first vibration is synchronous with the second vibration due to the known position of the first and second shafts,
   wherein a position-dependent irradiation of an irradiation point in the irradiation field is produced by way of position-dependent activation of the laser upon reaching the irradiation point and deactivation of the laser upon leaving the irradiation point, and
   wherein the generated first and second vibrations describe a continuous Lissajous curve in the irradiation field.

2. The control device of claim 1, wherein the Lissajous curve is closed.

3. The control device of claim 1, wherein the first and second frequencies and a phase difference between the first and second phases are selected such that the Lissajous curve forms a grid.

4. The control device of claim 1, wherein the first and second frequencies and a phase difference between the first and second phases are selected such that the Lissajous curve forms an internal grid which covers the irradiation field and an external outer grid.

5. The control device of claim 1, wherein different of the substantially two-dimensional layers are iteratively irradiated by the laser beam, with the at least one first and second rotatable mirrors generating a first Lissajous curve for irradiation of a first of the substantially two-dimensional layers and a second Lissajous curve for irradiation of a further of the substantially two-dimensional layers, with both of the at least one first and second rotatable mirrors designed to irradiate the respective first and further layers.

6. The control device of claim 1, wherein the irradiation points are irradiated iteratively multiple times.

7. The control device of claim 1, wherein the known positions the first and second shafts are determined from a calibration.

8. The control device of claim 1, further comprising a motor and a controller constructed to generate a continuous oscillation of the at least one first and second rotatable mirrors in relation to one another.

9. The control device of claim 8, wherein the motor comprises electronically or digitally synchronized servomotors.

10. The control device of claim 1, further comprising oscillators constructed to generate a continuous oscillation of the at least one first and second rotatable mirrors in relation to one another.

11. The control device of claim 10, in wherein the oscillators are constructed as galvanometers.

12. The control device of claim 10, wherein the oscillators are constructed to maintain a resonant frequency.

13. The control device of claim 10, wherein the oscillators comprise motors having a stable speed.

14. A method for controlling laser beam deflection for processing irradiation points in an irradiation field by a laser beam for laser-based additive manufacturing processes to produce three-dimensional components by layer-by-layer built-up of substantially two-dimensional layers, with the steps:

guiding the laser beam to the irradiation field by reflecting the laser beam with at least one first rotatable mirror secured on a first shaft and at least one second rotatable mirror on a second shaft and rotating orthogonally to the at least one first rotatable mirror, exciting the at least one first rotatable mirror with the first shaft to a continuous first vibration with a first frequency, and exciting the at least one second rotatable mirror with the second shaft to a continuous second vibration with a second frequency, wherein the first frequency is different from the second frequency or the first vibration has a phase difference with respect to the second vibration, wherein each of the first and second shafts has a known position, such that the first vibration is synchronous with the second vibration due to the known positions of the first and second shafts, wherein a position-dependent irradiation of an irradiation point in the irradiation field is produced by way of position-dependent activation of the laser upon reaching the irradiation point and deactivation of the laser upon leaving the irradiation point, and wherein the generated first and second vibrations describe a continuous Lissajous curve in the irradiation field.

15. The method of claim 14, wherein the first and second frequencies and a phase difference between the first and second phases are selected such that the Lissajous curve forms a grid.

16. The method of claim 14, wherein the first and second frequencies and a phase difference between the first and second phases are selected such that the Lissajous curve forms an internal grid which covers the irradiation field and an external outer grid.

17. The method of claim 14, wherein different of the substantially two-dimensional layers are iteratively irradiated by the laser beam, with the at least one first and second rotatable mirrors generating a first Lissajous curve for irradiation of a first of the substantially two-dimensional layers and a second Lissajous curve for irradiation of a further of the substantially two-dimensional layers, with both of the at least one first and second rotatable mirrors designed to irradiate the respective first and further layers.

18. The method of claim 14, wherein the irradiation points are irradiated iteratively multiple times.

19. The method of claim 14, wherein the known positions the first and second shafts are determined from a calibration.

* * * * *